United States Patent
Park et al.

(10) Patent No.: US 10,690,353 B2
(45) Date of Patent: Jun. 23, 2020

(54) VENTILATION SYSTEM AND METHOD FOR CONTROLLING THE SAME

(71) Applicant: Samsung Electronics Co., Ltd., Suwon-si, Gyeonggi-do (KR)

(72) Inventors: Dah We Park, Seoul (KR); Tim Rochford, Seongnam-si (KR); Sook Young Park, Yongin-si (KR); Myoung Keun Kwon, Seoul (KR); Eung Ryeol Seo, Suwon-si (KR); Jung Hak Lee, Suwon-si (KR); Ji Hyeong Lee, Seoul (KR); Dong Gi Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 15/863,457

(22) Filed: Jan. 5, 2018

(65) Prior Publication Data
US 2018/0195738 A1  Jul. 12, 2018

(30) Foreign Application Priority Data
Jan. 6, 2017  (KR) .................. 10-2017-0002469

(51) Int. Cl.
*F24C 15/20* (2006.01)
*F04D 27/00* (2006.01)
(Continued)

(52) U.S. Cl.
CPC ........ *F24C 15/2021* (2013.01); *F04D 27/004* (2013.01); *F04D 29/701* (2013.01);
(Continued)

(58) Field of Classification Search
CPC ............................ F24C 15/20; F24C 15/2042
See application file for complete search history.

(56) References Cited

U.S. PATENT DOCUMENTS 4,484,563 A * 11/1984 Fritz .................. F24C 15/20
126/299 D
6,072,169 A   6/2000 Kang et al.
(Continued)

FOREIGN PATENT DOCUMENTS

EP   2466218 A2   6/2012
JP   S63204048 S  8/1988
(Continued)

OTHER PUBLICATIONS

Communication from a foreign patent office in a counterpart foreign application, European Patent Office, "European Search Report," Application No. EP 17210920.9, dated May 30, 2018, 9 pages.
(Continued)

*Primary Examiner* — Gregory A Wilson

(57) ABSTRACT

A ventilation system and a method for discharging hazardous air during cooking are disclosed. The ventilation system allows hazardous air generated by cooking to flow in a backward direction of a cooking device so as to quickly transfer the hazardous air to a hood, such that the hazardous air is prevented from being inhaled by a user. As a result, the hazardous air may be concentrated into a predetermined region without being dissipated, and then subsequently discharged outside. Information about a quality of air generated in a current state of a cooking space is transferred to a user so that the user may more actively use the ventilation system, thereby better protecting the user's health.

15 Claims, 15 Drawing Sheets

(51) Int. Cl.
  *F24F 11/00* (2018.01)
  *F24F 11/52* (2018.01)
  *F04D 29/70* (2006.01)
  *F24F 110/65* (2018.01)
(52) U.S. Cl.
  CPC ...... *F24C 15/2028* (2013.01); *F24C 15/2042* (2013.01); *F24F 11/0001* (2013.01); *F24F 11/52* (2018.01); *F24F 2110/65* (2018.01)

(56) References Cited

U.S. PATENT DOCUMENTS

| | | | |
|---|---|---|---|
| 9,010,313 B2* | 4/2015 | Mikulec | F24C 15/2021 126/299 D |
| 2006/0154590 A1* | 7/2006 | Kanaya | F24F 7/06 454/56 |
| 2006/0278216 A1 | 12/2006 | Gagas et al. | |
| 2008/0029081 A1 | 2/2008 | Gagas et al. | |
| 2015/0226439 A1 | 8/2015 | Mikulec | |
| 2015/0373789 A1 | 12/2015 | Meusburger et al. | |
| 2016/0091211 A1 | 3/2016 | Min | |

FOREIGN PATENT DOCUMENTS

| | | | |
|---|---|---|---|
| JP | H03207925 A | | 9/1991 |
| JP | 2013061147 A | * | 4/2013 |
| JP | 2018181444 A | * | 11/2018 |
| KR | 10-2004-0100358 A | | 12/2004 |
| KR | 10-2004-0110856 A | | 12/2004 |
| KR | 20-0383526 Y1 | | 5/2005 |
| KR | 10-2005-0100335 A | | 10/2005 |
| KR | 10-0747633 B1 | | 8/2007 |
| KR | 10-2012-0090399 A | | 8/2012 |
| KR | 10-2015-0033775 A | | 4/2015 |
| KR | 10-2016-0007119 A | | 1/2016 |
| KR | 20-0479548 Y1 | | 2/2016 |
| WO | 2004072558 A1 | | 8/2004 |
| WO | 2011074250 A1 | | 6/2011 |

OTHER PUBLICATIONS

Communication from a foreign patent office in a counterpart foreign application, ISA/KR, "International Search Report," International Application No. PCT/KR2018/000227, dated Apr. 27, 2018, 3 pages.
European Patent Office, "Communication pursuant to Article 94(3) EPC," Application No. EP17210920.9, dated Apr. 25, 2019, 6 pages.
Communication pursuant to Article 94(3) EPC in connection with European Application No. 17210920.9 dated Mar. 23, 2020, 7 pages.

* cited by examiner

FIG. 6

|  | HOOD FAN ||  INDUCTION FAN ||
|---|---|---|---|---|
|  | SUCTION AIRFLOW | rpm | DISCHARGE AIRFLOW | rpm |
| FIRST STEP | $a_1$ | $A_1$ | $b_1$ | $B_1$ |
| SECOND STEP | $a_2$ | $A_2$ | $b_2$ | $B_2$ |
| THIRD STEP | $a_3$ | $A_3$ | $b_3$ | $B_3$ |
| ⋮ | ⋮ | ⋮ | ⋮ | ⋮ |
| N-TH STEP | $a_n$ | $A_n$ | $b_n$ | $B_n$ |

FIG. 7

|  | FINE DUST MEASUREMENT VALUE x (μg/m³) | ULTRA-FINE DUST MEASUREMENT VALUE y (μg/m³) | VOCs MEASUREMENT VALUE z (ppm) |
|---|---|---|---|
| FIRST STEP | $0 \leq x < x_1$ | $0 \leq y < y_1$ | $0 \leq z < z_1$ |
| SECOND STEP | $x_1 \leq x < x_2$ | $y_1 \leq y < y_2$ | $z_1 \leq z < z_2$ |
| THIRD STEP | $x_2 \leq x < x_3$ | $y_2 \leq y < y_3$ | $z_2 \leq z < z_3$ |
| ⋮ | ⋮ | ⋮ | ⋮ |
| N-TH STEP | $x_{n-1} \leq x < x_n$ | $y_{n-1} \leq y < y_n$ | $z_{n-1} \leq z < z_n$ |

VENTILATION SYSTEM AND METHOD FOR CONTROLLING THE SAME

CROSS-REFERENCE TO RELATED APPLICATION AND CLAIM OF PRIORITY

This application is related to and claims priority to Korean Patent Application No. 10-2017-0002469, filed on Jan. 6, 2017, the contents of which are incorporated herein by reference.

TECHNICAL FIELD

Embodiments of the present disclosure relate to a ventilation system for discharging hazardous air generated during cooking, and a method for controlling the same.

BACKGROUND

A cooking space such as a kitchen includes a hood for discharging fumes and heat caused by cooking to the outside.

Generally, the hood installed at an upper side of a cooking device may suction smoke and fumes generated by cooking. As the smoke and fumes spread upward, the hood region may need to be enlarged in proportion to the increasing hood height from the cooking device.

However, air pollutants (hereinafter referred to as hazardous air) such as fine dust, formaldehyde, carbon monoxide (CO), volatile organic compounds, etc. are generated in a cooking process of cooking materials such as cooking oil at a level exceeding a reference value regardless of the cooking device, and concentration of ultra-fine dust generated in most cooking processes is more than 25 times a reference concentration of ultra-fine dust.

Because of the environment of such cooking spaces such as a kitchen, many researchers have asserted that nonsmoking women suffer from higher rates of lung cancer due to hazardous air generated from the kitchen.

When a user opens a window and operates the hood to let fresh air in, a large amount of hazardous air is discharged outside. However, due to structural characteristics of the hood installed at the upper side of the cooking device, hazardous air and fine dust generated in the cooking of food may move upward toward the hood, and at the same time, hazardous air can move toward the respiratory organs of the user who cooks the food, such that the user inhales the hazardous air.

In addition, the user is unable to recognize a pollution level of the air generated by cooking. Some users who do not like listening to loud noise generated from the hood often prefer to cook food without operating the hood.

SUMMARY

To address the above-discussed deficiencies, it is a primary object to provide a ventilation system for allowing hazardous air generated by cooking to flow in a backward direction of a cooking device so as to quickly transfer the hazardous air to a hood, and a method for controlling the same.

It is another aspect of the present disclosure to provide a ventilation system for transferring information about a quality of air generated in a current state of a cooking space to a user so that the user can more actively use the ventilation system, and a method for controlling the same.

Additional aspects of the invention will be set forth in part in the description which follows and, in part, will be obvious from the description, or may be learned by practice of the invention.

According to certain embodiments of the present disclosure, a ventilation system includes a cooking device, a ventilation device installed at an upper part of the cooking device to discharge hazardous air generated during cooking, and a sensor portion configured to measure levels of fine dust and gas density contained in the hazardous air. The cooking device further includes an air induction device configured to direct the hazardous air to a rear side of the cooking device according to the measurement levels of fine dust and gas density measured by the sensor portion so that the resultant hazardous air is transmitted to the ventilation device.

The air induction device may be mounted to a rear surface of the cooking device to generate movement of air toward the ventilation device, and may direct the hazardous air to the rear side of the cooking device.

The air induction device may further include an air outlet configured to discharge air and an induction fan installed in the air outlet, and can be configured to generate movement of the air toward the ventilation device.

The air induction device may further include a blade configured to open or close the air outlet, wherein a direction of the movement of air discharged through the air outlet is controlled according to an angle of the blade.

The ventilation system may further include a hood fan configured to perform air ventilation so as to discharge the hazardous air, wherein the airflow suctioned into the ventilation device according to an operation of the hood fan and the airflow suctioned into the ventilation device according to an operation of the induction fan are summed up, such that intensity of suction airflow is adjusted according to the sum of the amount of suctioned air.

The ventilation system may further include a controller configured to control the airflow discharged through the air outlet and the airflow suctioned into the ventilation device. The controller adjusts intensity of the discharge airflow and intensity of the suction airflow according to the measurement levels of fine dust and gas density measured by the sensor portion.

The controller may set a ratio of the discharge airflow and the suction airflow to a predetermined ratio, and may thus adjust a revolutions per minute (RPM) of the induction fan and an RPM of the hood fan.

The sensor portion may measure the fine dust and gas density contained in the hazardous air even when cooking is not being performed, and the controller may adjust the intensity of suction airflow according to the measurement levels of fine dust and gas density measured by the sensor portion.

According to certain embodiments, the sensor portion may be mounted to the ventilation device. The ventilation device may further include a communication portion communicating with the cooking device.

The ventilation system may further include a display configured to display the fine dust and gas density measured by the sensor portion using numerals, colors, and letters. When the fine dust and gas density measured by the sensor portion exceed a safety reference, the controller may inform a user of the excess of the fine dust and gas density using the display.

The air induction device may be mounted to both sides of the cooking device, and generates movement of air toward the ventilation device, such that the hazardous air is directed to both sides of the cooking device.

In accordance with another aspect of the present disclosure, a ventilation system includes a cooking device, a ventilation device installed at an upper part of the cooking device to discharge hazardous air generated during cooking, a sensor portion configured to measure levels of fine dust and gas density contained in the hazardous air, and an air induction device mounted to a rear surface of the cooking device. The air induction device generates movement of air toward the ventilation device according to the measurement levels of fine dust and gas density measured by the sensor portion, and then directs the hazardous air to a rear side of the cooking device. The air induction device includes an air outlet to discharge the air, and an induction fan installed in the air outlet to generate movement of the air toward the ventilation device.

In accordance with another aspect of the present disclosure, a ventilation device includes a hood fan configured to perform air ventilation so as to discharge hazardous air generated during cooking, a sensor portion configured to measure levels of fine dust and gas density contained in the hazardous air, and a controller configured to control a speed of the hood fan according to the measurement levels of fine dust and gas density measured by the sensor portion.

The sensor portion may be mounted to the ventilation device. The controller may directly receive the measurement levels of fine dust and gas density measured by the sensor portion from the sensor portion, and may thus control the speed of the hood fan.

The ventilation system may further include a display configured to display the fine dust and gas density measured by the sensor portion using numerals, colors, and letters. When the fine dust and gas density measured by the sensor portion exceed a safety reference, the controller may inform a user of the excess of the fine dust and gas density using the display.

In accordance with another aspect of the present disclosure, a cooking device includes an induction fan, a sensor portion, and a controller. The induction fan generates movement of air in a manner that hazardous air generated during cooking is discharged through the ventilation device. The sensor portion may measure the levels of fine dust and gas density contained in the hazardous air. The controller may control a speed of the induction fan according to measurement levels of fine dust and gas density measured by the sensor portion.

The sensor portion may be mounted to the ventilation device. The controller may wirelessly receive measurement levels of fine dust and gas density measured by the sensor portion from the ventilation device, and may control a speed of the induction fan.

The induction fan may be mounted to a rear surface of the cooking device, may generate movement of the air toward the ventilation direction, and may direct the hazardous air to the rear side of the cooking device.

In accordance with another aspect of the present disclosure, a method for controlling a ventilation system which includes a cooking device, a ventilation device installed at an upper part of the cooking device to discharge hazardous air generated during cooking, and an air induction device mounted to a rear surface of the cooking device to direct the hazardous air to a rear side of the cooking device. According to certain embodiments, the method includes the steps of determining whether the cooking device is powered on; when the cooking device is powered on, automatically powering on the ventilation device, and operating a hood fan mounted to the ventilation device; when the hood fan is operated, operating an induction fan mounted to the air induction device, and generating movement of air toward the ventilation device; measuring, by a sensor portion, levels of fine dust and gas density contained in the air generated during the cooking; and adjusting the airflow suctioned into the hood fan and the airflow discharged through the induction fan according to the measurement levels of fine dust and gas density measured by the sensor.

Adjusting the airflow suctioned into the hood fan and the airflow discharged through the induction fan may include adjusting the airflow suctioned into the ventilation device according to a revolutions per minute (RPM) control of the hood fan and the airflow discharged through the air outlet according to RPM control of the induction fan.

The method may further include adjusting a direction of the movement of air discharged through the air outlet according to an angle of a blade configured to open or close the air outlet.

The method may further include, when the cooking device is powered off, switching the ventilation device to a standby mode, and measuring fine dust and gas density contained in the air using the sensor portion, and adjusting the airflow suctioned into the hood fan according to the measurement levels of fine dust and gas density measured by the sensor portion.

The method may further include displaying the measured fine dust and gas density on a display using numerals, colors, and letters, and when the measured fine dust and gas density exceed a safety reference, informing a user of the excess of the fine dust and gas density using the display.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates aspects of the control logic for an induction fan according to certain embodiments of the present disclosure.

FIG. 7 illustrates aspects of the control logic for adjusting suction and discharge airflows according to certain embodiments of the present disclosure.

DETAILED DESCRIPTION

Figure 1:
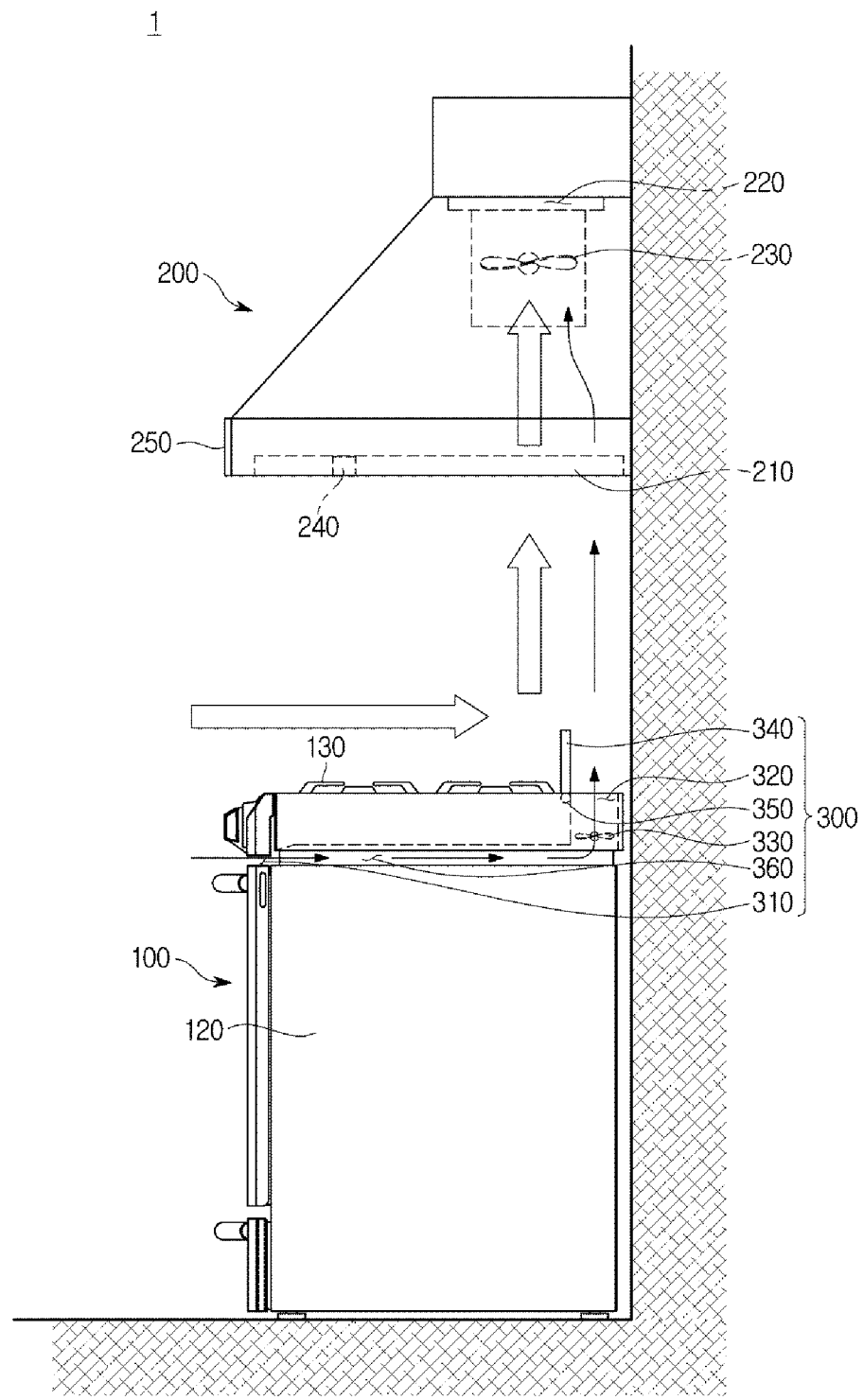
FIG. 1 illustrates a ventilation system according to certain embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

FIG. 1 illustrates a ventilation system according to certain embodiments of the present disclosure.

Referring to FIG. 1, the ventilation system 1 may include a cooking device 100 for cooking food, and a ventilation device 200 installed at an upper part of the cooking device 100 so as to exhaust hazardous air generated by cooking.

The cooking device 100 may comprise an electric-type or gas-type cooktop 130 installed at an upper part thereof, and may also comprise an oven 120 installed at a lower part thereof. The cooking device 100 will hereinafter be described with reference to FIG. 2.

According to certain embodiments, the ventilation device 200 may be a kitchen hood for exhausting smoke and heat generated by cooking to the outside, and may discharge the hazardous air generated from the cooking space to the outside.

The ventilation device 200 may include a hood inlet 210 for suctioning hazardous air generated during cooking, a hood outlet 220 for discharging the suctioned hazardous air to the outside. The ventilation device 200 may further include a hood fan 230 for performing ventilation, so that the hood fan 230 can suction the hazardous air of the cooking space through the hood inlet 210 and can discharge the suctioned hazardous air to the hood outlet 220.

The hazardous air of the cooking space may be suctioned through the hood inlet 210 according to the operation of the hood fan 230, and may be discharged to the outside or to an exhaust duct after passing through the hood outlet 220.

According to certain embodiments, the ventilation device 200 may include a sensor portion 240 and a display 250. The sensor portion 240 may measure fine dust, gas density, and air volume of the hazardous air generated from the cooking space. The display 250 may display the measured fine dust, gas density, and air volume obtained from the sensor portion 240.

The sensor portion 240 may include a communication module, and may be embedded in the hood or may be implemented as an accessory-type device mounted to the hood.

An air induction device 300 may be mounted to a rear surface of the cooking device 100. The air induction device 300 may generate airflow toward the ventilation device 200, and may direct the hazardous air generated during cooking to the rear of the cooking device 100.

According to some embodiments, air induction device 300 may include an air inlet 310, an air outlet 320, and an induction fan 330. The air inlet 310 may be formed at a front surface of the cooking device 100 so as to suction the air from the cooking space (i.e., a front side of the cooking device where the user is located). The air outlet 320 may be formed at a rear surface of the cooking device so as to discharge the air of the cooking space toward the ventilation device 200. The induction fan 330 may suction the air of the cooking space through the air inlet 310, to generate airflow using a difference in atmospheric pressure so that the suctioned air can be discharged through the air outlet 320, and direct the air to the hood inlet 210 of the ventilation device 200.

According to some embodiments, induction fan 330 may be disposed in the air outlet 320. When the induction fan 330 generates a constant flow rate or a variable flow rate toward the hood inlet 210 of the ventilation device 200, dynamic pressure increases such that static pressure can be relatively reduced in the vicinity of hood inlet 210. Therefore, suction performance is added to the suction performance of the ventilation device 200, such that the airflow suctioned by the ventilation device 200 increases and the hazardous air generated during cooking can be safely and efficiently discharged outside, The air outlet 320 may be opened or closed by a blade 340, and may control the flow direction of the air discharged through the air outlet 320 according to an angle of the blade 340.

The blade 340 may be opened or closed by an opening/closing motor 350 mounted to one side of the blade 340.

The air induction device 300 may include an air channel 360 disposed between the air inlet 310 and the air outlet 320, such that air received through the air inlet 310 can be discharged through the air outlet 320.

Therefore, the air of the cooking space may be received through the air inlet 310 due to the operation of induction fan 330, the received air may be discharged through the air outlet 320 along the air channel 360, and the discharged air may be transferred to the hood inlet 210 of the ventilation device 200, According to some embodiments, the ratio of the airflow (i.e., the discharge airflow) discharged through the air outlet 320 to the airflow (i.e., the suction airflow) suctioned through the ventilation device 200 preferably corresponds to a predetermined ratio.

When the airflow discharged through the air induction device 300 is much less than the airflow suctioned through the ventilation device 200, the air induction device 300 may cause adverse effects in which the hazardous air is spread out.

Alternatively, when the airflow suctioned through the ventilation device 200 is much more than the airflow discharged through the air induction device 300, the static pressure effect of the air induction device 300 is minimal, so that a smaller amount of hazardous air is directed to the rear surface of the cooking device 100 spaced apart from the user.

Therefore, according to some embodiments the ratio of the airflow discharged through the air outlet 320 to the airflow suctioned through the ventilation device 200 is preferably set at or near an optimum ratio. As a result, the hazardous air generated by cooking may be directed to the rear surface of the cooking device 100 spaced apart from the user, such that the hazardous air can be safely and efficiently discharged outside.

The airflow discharged through the air induction device 300 and the airflow suctioned through the ventilation device 200 may be controlled according to the RPM of the induction fan 330 and the RPM of the hood fan 230. A detailed description thereof will hereinafter be given with reference to FIG. 6.

As described above, the ratio of the airflow discharged through the air induction device 300 to the airflow discharged through the ventilation device 200 may be set to a predetermined ratio, such that a predetermined airflow may also be discharged outside, irrespective of conditions of the ventilation device 200.

In addition, the cooking device 100 may receive information measured by the sensor portion 240 of the ventilation device 200, such that the air induction device 300 may start operation or may stop operation, and a flow rate of the air induction device 300 may be automatically adjusted.

In the non-limiting example of FIG. 1, the air induction device 300 is installed at a rear surface of the cooking device 100. However, the scope or spirit of the present disclosure is not limited thereto, and the air induction device 300 may also be installed at both sides of the cooking device 100 so as to achieve the same objects and effects as those of the present disclosure.

Although certain embodiments of the present disclosure have been described such that, the air induction device 300 is embedded in the cooktop 130 of the cooking device 100, the scope or spirit of the present disclosure is not limited thereto, and the air induction device 300 may be constructed in the form of a kit loaded on the cooktop 130.

Although in the non-limiting example of FIG. 1, the air outlet 320 is opened or closed by the blade 340 for convenience of description, the scope or spirit of the present disclosure is not limited thereto, and all shapes of air outlets 320 through which the air directed to the rear surface of the cooking device 100 is rapidly transferred to the ventilation device 200 without using the blade 340 may also be constructed to achieve the same objects and effects as those of the present disclosure.

Figure 2:
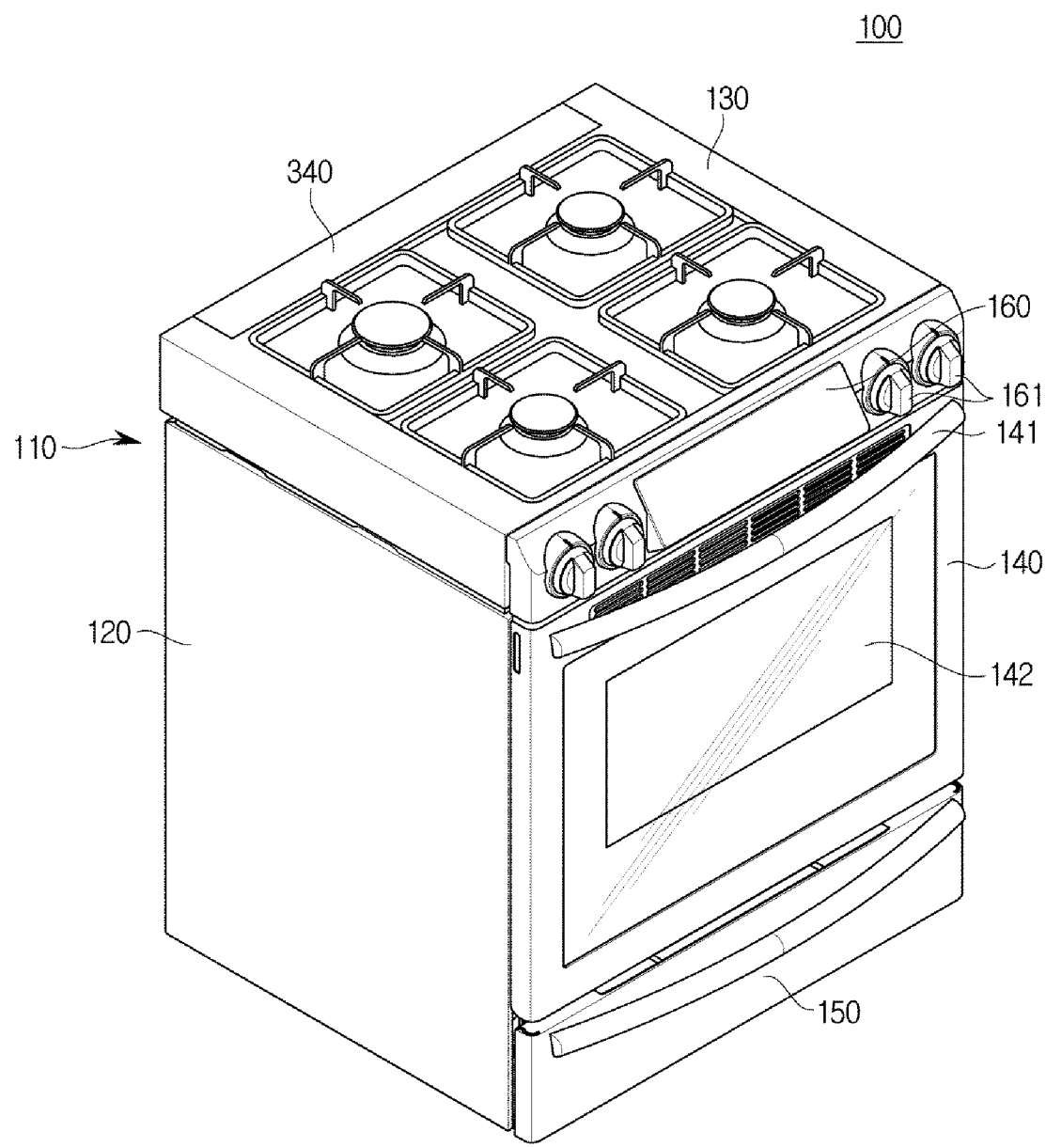
FIG. 2 illustrates a perspective view of a closed state of an air outlet of a cooking device according to certain embodiments of the present disclosure.
Figure 3:
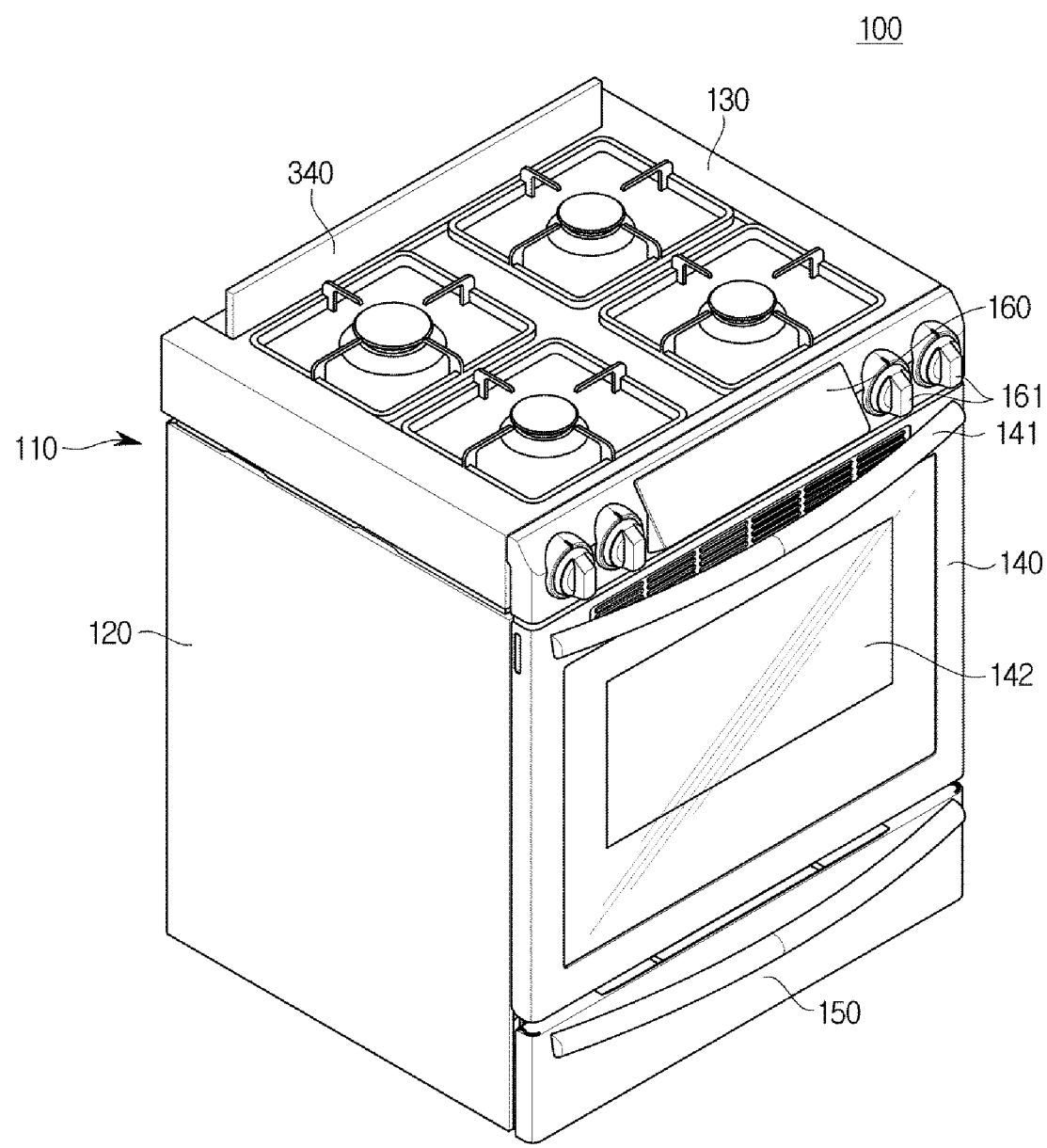
FIG. 3 illustrates a perspective view of an open state of the air outlet of the cooking device according to certain embodiments of the present disclosure.

FIG. 2 illustrates a perspective view of a closed state of an air outlet of a cooking device according to certain embodiments of the present disclosure. FIG. 3 illustrates a perspective view of an open state of the air outlet of the cooking device according to certain embodiments of the present disclosure.

Referring to the non-limiting examples of FIGS. 2 and 3, the cooking device 100 may include a cabinet 110, an oven 120, and a cooktop 130. The cabinet 110 may form the external appearance thereof, and may include various constituent elements therein. The oven 120 may be installed at a lower part of the cabinet 110. The cooktop 130 may be installed at an upper part of the oven 120, and a container having food to be cooked may be loaded on the cooktop 130 so that the cooktop 130 may heat the container containing the food.

The oven 120 may be formed in a box shape and may be installed at a lower part of the cabinet 110, such that a front side of the oven 120 may be opened in a manner that food can enter or exit the oven 120 through the front side.

In addition, the oven 120 may include a cooking chamber formed by an inner wall formed in a rectangular parallelepiped shape having an open front side.

The open front side of the oven 120 may be opened or closed by a door 50. The door 140 may be hinged to a lower part of the cabinet 110 so that the door 140 can be pivotably movable with respect to the cabinet 110. The door 140 may include a handle 141 capable of being grasped by the user.

The door 140 may include a transparent portion 142 formed of a transparent material such as glass such that the user located outside may view the cooking process of food contained in the oven 120. The transparent portion 142 may be formed of a transparent member instead of glass so that the user can view the indoor space of the oven 120 through the transparent portion 142.

A storage chamber 150 for storing a cooking container may be installed at a lower side of the oven 120. The storage chamber 150 may be slidably movable in a forward or backward direction of the cooking device 100, such that the storage chamber 150 may be inserted into or ejected from the cooking device 100 in a forward or backward direction.

A display 160 may be installed at a front upper side of the cooking device 100, and may display various kinds of operation information of the cooking device 100 thereon, such that the user may input an operation command through the display 160. A manipulation portion 161 for allowing the user to input an operation command of the cooking device 100 may be installed at both sides of the display 160.

Figure 4:
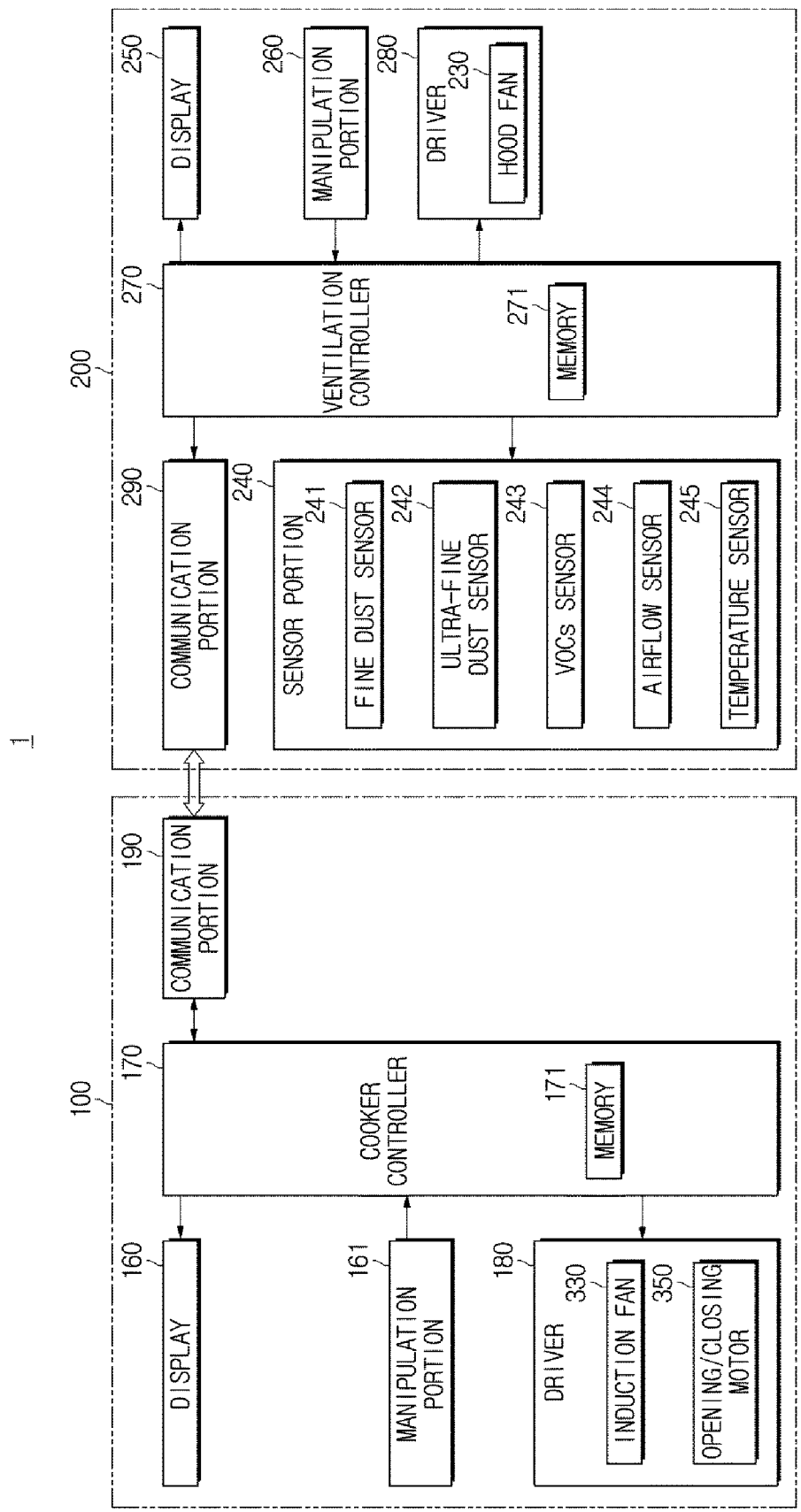
FIG. 4 illustrates, in block diagram, format a ventilation system according to certain embodiments of the present disclosure.

FIG. 4 illustrates, in block diagram format, a ventilation system according to certain embodiments of the present disclosure.

Referring to FIG. 4, according to certain embodiments, the cooking device 100 may further include a display 160, a manipulation portion 161, a cooking-device controller (hereinafter referred to as a cooker controller) 170, a driver 180, and a communication portion 190.

The display 160 may display various kinds of operational information of the cooking device 100 and a user-manipulated operation state according to a display control signal of the cooker controller 170.

The display 160 may display the operational state of the cooking device 100 according to a display control signal of the cooker controller 170, and at the same time may display the user-manipulated operation state by recognizing operation information entered through the manipulation portion 161 according to the display control signal of the cooker controller 170. The display 160 may be implemented using a Liquid Crystal Display (LCD) panel, a Light Emitting Diode (LED) panel, an Organic Light Emitting Diode (OLED) panel, or the like.

In addition, the display 160 may display the concentration of fine dust, gas density, and air volume of the cooking space measured by the sensor portion 240 of the ventilation device 200. In this case, the display 160 may display the concentration of fine dust and the gas density using numerals or colors.

The manipulation portion 161 may receive input commands associated with the operation of the cooking device 100 and may be constructed as a knob, keys, buttons, switches, a touch pad, etc., and may include any device capable of generating predetermined input data by pushing, touching, pressing, rotating, and the like.

The cooker controller 170 may include at least one processor for controlling overall operation of the cooking device 100 according to the operation command received from the manipulation portion 161.

The cooker controller 170 may automatically adjust a level (discharge airflow) of the air induction device 300 according to a level (suction airflow) of the ventilation device 200.

According to certain embodiments, in order to adjust the level (discharge airflow) of the air induction device 300, the cooker controller 170 may store flow rate data for controlling the RPM of the induction fan 330 in the range from the first step to the N-th step in a ROM table. The RPM for each step of the induction fan 330 may be set to a specific RPM at which the suction airflow and the discharge airflow can be optimally adjusted. The first-step RPM of the hood fan 230 and the induction fan 330 may be set to, for example, a ratio of 6 to 1. Therefore, the RPM of the induction fan 330 may be set to a specific ratio at which the suction airflow and the discharge airflow can be optimally adjusted according to the RPM for each step.

In addition, the cooker controller 170 may display the concentration of fine dust, gas density, etc. of the cooking space measured by the ventilation device 200 by communicating with the ventilation device 200 connected to the cooking device 100.

The cooker controller 170 may include a memory 171. The memory 171 may store control data for controlling the operation of the cooking device 100, reference data used in control of the cooking device 100, operation data generated during a predetermined operation of the cooking device 100, and setting information such as setting data entered via the manipulation portion 161 in a manner that the cooking device 100 performs a predetermined operation.

According to certain embodiments of the present disclosure, memory 171 may be implemented as a non-volatile memory device such as a read only memory (ROM), programmable read only memory (PROM), erasable programmable read only memory (EPROM), or flash memory, a volatile memory device such as a random access memory (RAM), or a storage portion such as a hard disk or an optical disc. However, the memory 171 is not limited thereto and may also be implemented as any other storage devices known to those skilled in the art.

The driver 180 may include an induction fan 330 and an opening/closing motor 350. The induction fan 330 may allow air of the cooking space to flow in response to a drive control signal of the controller 170 so that the resultant air is directed to a rear surface of the cooking device 100. The opening/closing motor 350 may open or close the blade 340.

The driver 180 may power various loads associated with the operation of the cooking device 100.

The communication portion 190 may support communication with the ventilation device 200, and may connect the ventilation device 200 to the cooking device 100 over a network so that the communication portion 190 can communicate with the ventilation device 200.

As a non-limiting example, the communication portion 190 may include a Wireless Fidelity (Wi-Fi) communication module to connect to a local area network (LAN) through an access point (AP) or the like, a Bluetooth communication module to communicate with a single external device on a one-to-one basis or to communicate with a small number of external devices on a one-to-multiple basis, and a broadcast signal reception module to Rx receive a digital broadcast signal.

In addition, the communication portion 190 may also be connected to other devices using any one of GSM/3GPP-based schemes (GSM, HSDPA, LTE Advanced, etc.), 3GPP2-based schemes (such as CDMA), or WiMAX-based communication schemes.

The communication portion 190 may be connected to other devices so that information can be communicated between the communication portion 190 and the other devices. In more detail, the communication portion 190 may be connected to a mobile terminal located near the cooking device 100 or a server located at a remote site, and may transmit information to the mobile terminal or the server. For example, the communication portion 190 may be connected to the ventilation device 200, and may receive information stored in the ventilation device 200 or information measured by the ventilation device 200.

Referring to FIG. 4, the ventilation device 200 may, according to certain embodiments, further include a sensor portion 240, a display 250, a manipulation portion 260, a ventilation controller 270, a driver 280, and a communication portion 290.

The sensor portion 240 may be various sensors mounted to the ventilation device 200 so as to measure the degree of air pollution generated during cooking. The sensor portion 240 may include a fine dust sensor (PM10 sensor), an ultra-fine dust sensor (PM2.5 sensor), a gas sensor ($VOC_s$ sensor), an airflow sensor, a temperature sensor, and the like. The fine dust sensor (PM10 sensor) may measure the concentration of fine dust having a particle size of less than 10 μm (the size of fine particles is ⅕ times the hair thickness) from among dust contained in the air of the cooking space. The ultra-fine dust sensor (PM2.5 sensor) may measure the concentration of fine dust having a particle size of less than 2.5 μm (the size of fine particles is ⅕ times the hair thickness) from among dust contained in the air of the cooking space. The gas sensor ($VOC_s$ sensor) may measure the concentration of $H_2$ (hydrogen), $H_2S$ (hydrogen sulfide), $NH_3$ (ammonia), $C_2H_5OH$ (ethanol), CO (carbon monoxide), CH4 (methane), $C_3H_8$ (propane), etc. contained in the air of the cooking space. The airflow sensor may measure the suction airflow of the ventilation device 200. The temperature sensor may measure a temperature of the cooking space.

The sensor portion 240 may measure the degree of air pollution of the cooking space even when the user is not cooking, such that hazardous air can be automatically discharged outside when the cooking space has low-quality air.

The display 250 may, according to certain embodiments, display various operation information of the ventilation device 200 and a user's manipulation state according to a display control signal of the ventilation controller 270.

The display 250 may display the operational states of the cooking device 100 according to a display control signal of the ventilation controller 270, may recognize the operation information entered via the manipulation portion, and may thus display the user-manipulated operation state. The display 250 may be implemented by any one of a Liquid Crystal Display (LCD) panel, a Light Emitting Diode (LED) panel, an Organic Light Emitting Diode (OLED) panel, etc., without being limited thereto.

The display 250 may display fine dust (ultra-fine dust) of the cooking space, gas density, airflow, etc. measured by the sensor unit 240. In this case, the display 250 may display the concentration of fine dust (ultra-fine dust) and the level of gas density using numerals and colors.

The manipulation portion may be configured to allow the user to input a command for performing the operation of the ventilation device 200 according to the user's on/off manipulation or the user's rpm manipulation, may include keys, buttons, switches, a touchpad, etc., and may include any device generating predetermined input data in response to pushing, touching, pressing, rotating, and the like.

The ventilation controller 270 may, according to some embodiments, include at least one processor for controlling overall operation of the ventilation device 200 according to operation information entered via the manipulation portion.

The ventilation controller 270 may adjust the level (suction airflow) of the ventilation device 200 according to the level of fine dust (ultra-fine dust) contained in the air and the level of gas density measured by the sensor portion 240.

The ventilation controller 270 may store airflow data for controlling the RPM of the hood fan 230 in the range from the first step to the N-th step so as to adjust the level (suction airflow) of the ventilation device 200 in the ROM table. The RPM for each step of the hood fan 230 may be set to a specific RPM at which the suction airflow and the discharge airflow can be optimally adjusted. The first-step RPM of the hood fan 230 and the induction fan 330 may be set to, for example, the ratio of 6 to 1. Therefore, the RPM of the induction fan 330 may be set to a specific ratio at which the suction airflow and the discharge airflow can be optimally adjusted according to the RPM for each step.

According to embodiments, ventilation controller 270 may include a memory 271. The memory 271 may store control data for controlling the operation of the ventilation device 200, reference data used in control of the ventilation device 200, operation data generated during a predetermined operation of the ventilation device 200, and setting information such as setting data entered via the manipulation portion in a manner that the ventilation device 200 performs a predetermined operation.

The memory 271 may be implemented as a non-volatile memory device such as a read only memory (ROM), programmable read only memory (PROM), erasable programmable read only memory (EPROM), or flash memory, a volatile memory device such as a random access memory (RAM), or a storage portion such as a hard disk or an optical disc. However, the memory 271 is not limited thereto and may also be implemented as any other storage devices known to those skilled in the art.

The driver 280 may include a hood fan 230 for suctioning the air discharged from the cooking device 100 toward the ventilation device 200 according to a drive control signal of the ventilation controller 270.

The driver 280 may also power various loads related to the operation of the ventilation device 200.

The communication portion 290 may be a communication module to communicate with the cooking device 100, and may connect the ventilation device 200 to the cooking device 100 over the network. For example, the communication portion 290 may include a Wireless Fidelity (Wi-Fi) communication module to connect to a local area network (LAN) through an access point (AP) or the like, a Bluetooth communication module to communicate with a single external device on a one-to-one basis or to communicate with a small number of external devices on a one-to-multiple basis, and a broadcast signal reception (Rx) module to receive a digital broadcast signal.

In addition, the communication portion 290 may also be connected to other devices using any one of GSM/3GPP-based schemes (GSM, HSDPA, LTE Advanced, etc.), 3GPP2-based schemes (such as CDMA), or WiMAX-based communication schemes.

The communication portion 290 may be connected to other devices so that information can be communicated between the communication portion 290 and the other devices. In more detail, the communication portion 290 may be connected to a mobile terminal located near the ventilation device 200 or a server located at a remote site, and may transmit information to the mobile terminal or the server. For example, the communication portion 290 may be connected to the cooking device 100, and may receive information stored in the cooking device 100.

The operations and effects of the ventilation system and the method for controlling the same according to the embodiment of the present disclosure will hereinafter be described, Prior to describing the embodiment of the present disclosure, the airflow discharged through the air induction device 300 located at a rear surface of the cooking device 100 may, for the purposes of the present disclosure, be referred to as "discharge airflow", and the airflow suctioned through the ventilation device 200 may, for the purposes of the instant disclosure, be referred to as "suction airflow".

According to certain embodiments, a case the ventilation device 200 is automatically operated only when the cooking device 100 is powered on may be defined as an operation mode, and a case in which the degree of air pollution (e.g., fine dust, gas density, etc.) is measured even when the cooking device 100 is powered off so that the hazardous air is automatically discharged outside when the cooking space has low-quality air may be defined as a safety mode.

Figure 5A:
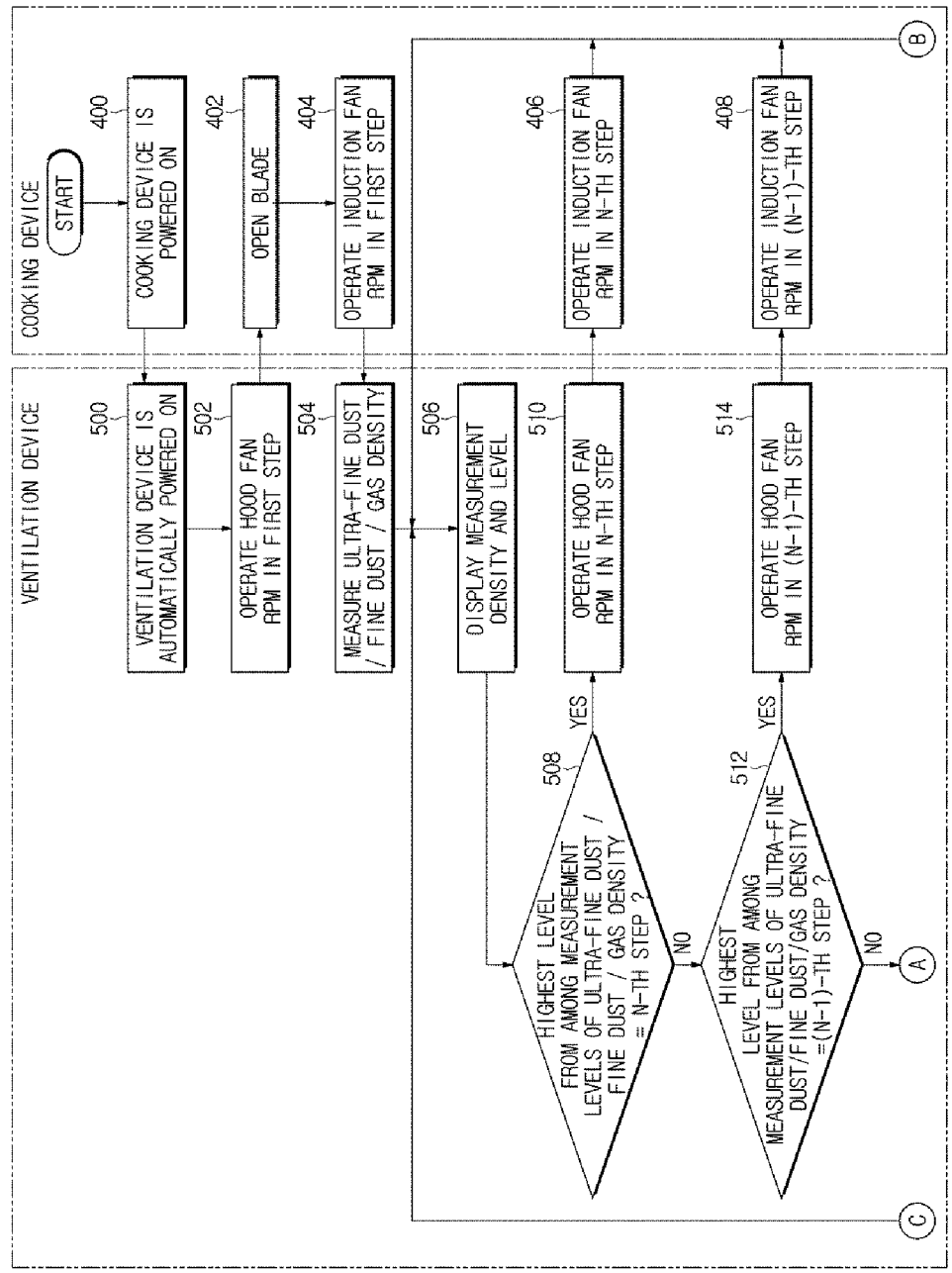
FIGS. 5A and 5B illustrate, in flowchart format, an algorithm for controlling an operation mode of a ventilation system according to certain embodiments of the present disclosure.
Figure 5B:
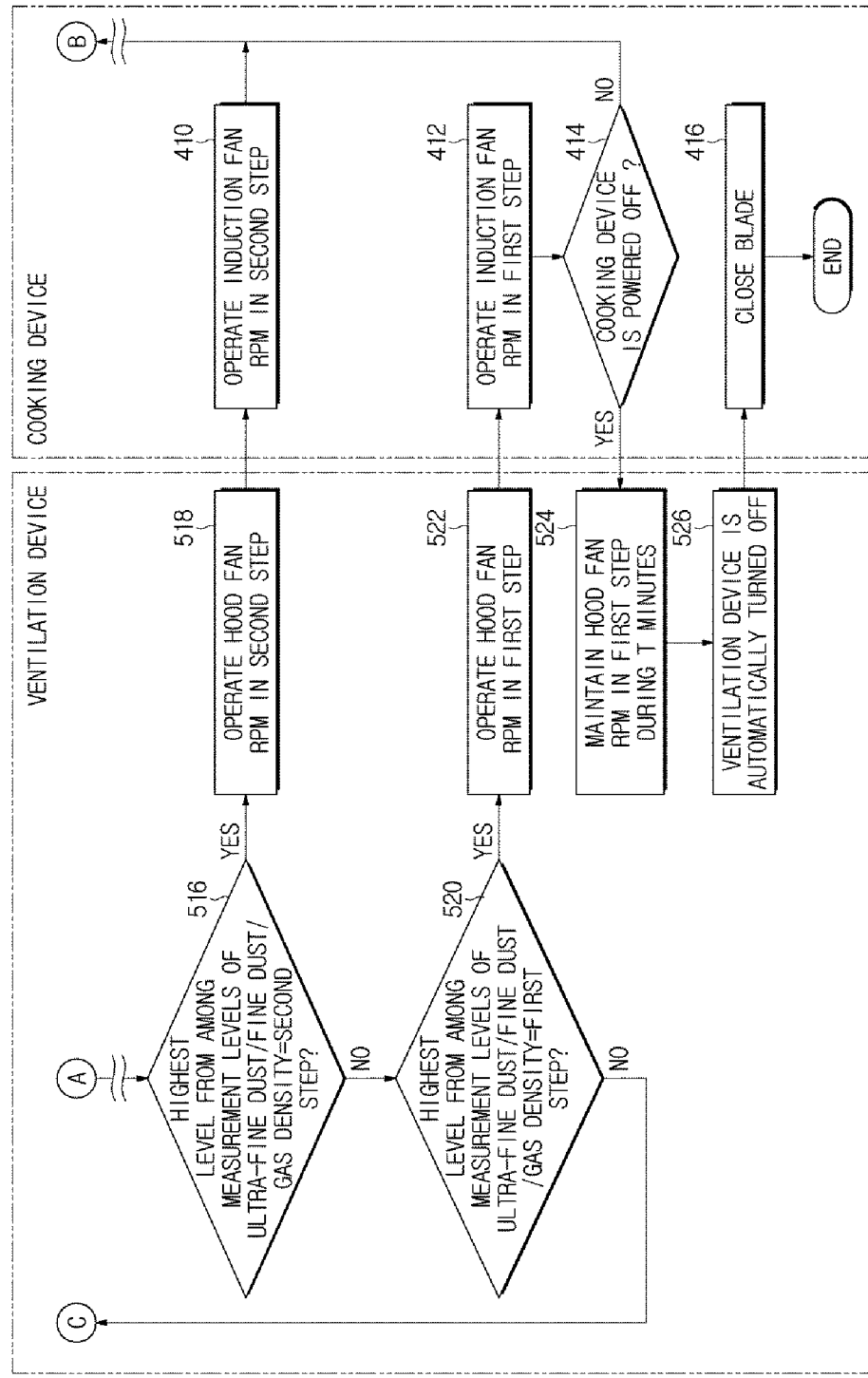

FIGS. 5A and 5B illustrate in flowchart format, an algorithm for controlling an operation mode of the ventilation system according to certain embodiments of the present disclosure.

Referring to the non-limiting examples of FIGS. 5A and 5B, when the cooking device 100 is powered on (400), the ventilation device 200 is also automatically powered on (500).

According to certain embodiments, when the ventilation device 200 is powered on, the ventilation controller 270 may start operation of the RPM of the hood fan 230 in the first step (502). In this case, the first-step RPM of the hood fan 230 may be set to a value stored in the ventilation controller 270.

According to certain embodiments, when the hood fan 230 starts operation in the first-step RPM, the cooker controller 170 may open the air outlet 320 by opening the blade 340 of the air induction device 300 (402).

In the non-limiting examples of FIGS. SA and SB, when the air outlet 320 is opened, the cooker controller 170 may start operation of the RPM of the induction fan 330 in the first step (404). In this case, the first-step RPM of the induction fan 330 may be set to a value stored in the cooker controller 170.

Subsequently, the ventilation device 200 may measure the concentration of fine dust (ultra-fine dust) and the density of gas generated in the cooking space during cooking using the sensor portion 240 (504).

According to some embodiments, the ventilation controller 270 may detect the level of fine dust (ultra-fine dust) and the level of gas density measured by the sensor portion 240, and may display the detected levels of fine dust and gas density on the display 250 (506).

Subsequently, the ventilation controller 270 may determine whether the highest level from among the measurement levels of fine dust (ultra-fine dust) and gas density is set to the N-th step (508).

According to certain embodiments, the highest level from among the measurement levels of fine dust (ultra-fine dust) and gas density is set to the N-th step (508), the ventilation controller 270 may operate the RPM of the hood fan 230 in the N-th step (510), and the cooker controller 170 may operate the RPM of the induction fan 330 in the N-th step (406).

In this non-limiting example, when the measurement level of fine dust (ultra-fine dust) and gas density is set to the N-th step, the level (suction airflow) of the ventilation device 200 is automatically adjusted to the N-th step. When the level (suction airflow) of the ventilation device 200 is adjusted to the N-th step, the level of the air induction device 300 may also be automatically adjusted to the N-th step.

In this non-limiting example, when the highest level is not identical to the N-th step (508), the ventilation controller 270 may determine whether the highest level from among the measurement levels of fine dust (ultra-fine dust) and gas density is set to the (N–1)-th step (512).

In this non-limiting example, when the highest level is set to the (N–1)-th step (512), the ventilation controller 270 may operate the RPM of the hood fan 230 in the (N–1)-th step (514), and the cooker controller 170 may operate the RPM of the induction fan 330 in the (N–1)-th step (408).

In this non-limiting example, when the measurement level of fine dust (ultra-fine dust) and gas density is set to the (N–1)-th step, the level (suction airflow) of the ventilation device 200 is automatically adjusted to the (N–1)-th step. When the level (suction airflow) of the ventilation device 200 is adjusted to the (N–1)-th step, the level (discharge airflow) of the air induction device 300 may also be automatically adjusted to the (N–1)-th step.

In this non-limiting example, when the highest level is not identical to the (N–1)-th step (512), the ventilation controller 270 may determine whether the highest level from among the measurement levels of fine dust (ultra-fine dust) and gas density is set to the second step (516).

In this non-limiting example, when the highest level is the second step (516), the ventilation controller 270 may operate the RPM of the hood fan 230 in the second step (518), and the cooker controller 170 may operate the RPM of the induction fan in the second step (410).

When each of the measurement level of fine dust (ultra-fine dust) and the measurement level of gas density is set to the second step, the level (suction airflow) of the ventilation device 200 is automatically adjusted to the second step. When the level (suction airflow) of the ventilation device 200 is adjusted to the second step, the level of the air induction device 300 may also be automatically adjusted to the second step.

According to certain embodiments, when the highest level is not identical to the second step (516), the ventilation controller 270 may determine whether the highest level from among the measurement levels of fine dust (ultra-fine dust) and gas density is identical to the first step (520).

When the highest level is set to the first step (520), the ventilation controller 270 may operate the RPM of the hood fan 230 in the first step (522), and the cooker controller 170 may operate the RPM of the induction fan 330 in the first step (412).

According to certain embodiments, when each of the measurement levels of fine dust (ultra-fine dust) and gas density is set to the first step, the level (suction airflow) of the ventilation device 200 is automatically adjusted to the first step. When the level (suction airflow) of the ventilation device 200 is adjusted to the first step, the level (discharge airflow) of the air induction device 300 may also be automatically adjusted to the first step.

In this non-limiting example, the sensor portion 240 may measure the concentration of fine dust (ultra-fine dust) and gas density during cooking, the suction airflow intensity of the ventilation device 200 and the discharge airflow intensity of the air induction device 300 are automatically adjusted according to the level (the degree of air pollution) measured by the sensor portion 240, feedback data is continuously communicated between the ventilation device 200 and the air induction device 300 of the cooking device 100, such that the hazardous air of the cooking space can be timely discharged under an optimum condition.

According to certain embodiments, the on/off operation of the ventilation device 200, the suction airflow intensity, etc. are automatically controlled without user intervention, such that the hazardous air generated from the cooking space can be efficiently discharged outside.

In this non-limiting case, the level (discharge airflow) of the air induction device 300 may be re-adjusted optimally according to the airflow level measured by the sensor portion 240.

Although the level (suction airflow) of the ventilation device 200 can, according to certain embodiments, be automatically adjusted according to the levels of fine dust (ultra-fine dust) and gas density measured by the sensor portion 240, it should be noted that the level (suction airflow) of the ventilation device 200 may also be directly manipulated by the user.

Subsequently, the cooker controller 170 may determine whether the cooking device 100 is powered off (414). When the cooking device 100 is not powered off (414), the operation may feed back to step 506, feedback data is continuously communicated between the ventilation device 200 and the air induction device 300 according to the degree of air pollution measured by the sensor portion 240, and at the same time the suction airflow intensity and the discharge airflow intensity are adjusted and the subsequent operations are carried out.

According to some embodiments, when the cooking device 100 is powered off (414), the ventilation device 200 may maintain the RPM of the hood fan 230 in the first step during a predetermined time (T minutes, for example, about 5 to 10 minutes) (524). After the passage of T minutes, the ventilation device 200 is automatically powered off (526).

When the ventilation device 200 is powered off, the cooker controller 170 may close the air outlet 320 by closing the blade 340 of the air induction device 300 (416).

Although, in some embodiments, the cooking device 100 is powered off by the user after completion of cooking, when the ventilation device 200 and the air induction device 300 of the cooking device 100 are operated to exhaust the hazardous air until each of the concentration of fine dust and gas density measured by the sensor portion 240 reaches a clean level, the ventilation device 200 and the air induction device 300 of the cooking device 100 are automatically stopped so that the hazardous air generated from the cooking space can be completely discharged outside.

Although FIGS. 5A and 5B have described a non-limiting example in which the sensor portion 240 is embedded in the ventilation device 200 such that the cooking device 100 is interoperable with the ventilation device 200, the scope or spirit of the present disclosure is not limited thereto. When the sensor portion 240 is an outer-mounted type not embedded in the ventilation device 200 and the cooking device 100 is not interoperable with the ventilation device 200, it may be possible to achieve the same objects and effects as those of the present disclosure.

A detailed description thereof is as follows.

First, the sensor portion 240 may measure the concentration of fine dust and gas density contained in the air.

When the concentration of fine dust and gas density measured by the sensor portion 240 exceed the clean level after the user operates the cooking device 100 and starts cooking, an alarm message needed to operate both the ventilation device 200 and the air induction device 300 of the cooking device 100 may be transferred to the user. In this case, the alarm message may be provided through the display 160 of the cooking device 100 or through the display 250 of the ventilation device 200, and may also be provided to the user through separate sound output.

When the alarm message is provided to the user as described above, the user may operate the air induction device 300 of the cooking device 100. When the user powers the ventilation device 200 on, a signal such as vibration may be detected so that the air induction device 300 of the cooking device 100 may be automatically operated using the detected signal.

In this case, the discharge airflow of the air induction device 300 may be adjusted to an optimum value according to the airflow level measured by the sensor portion 240. During cooking, feedback data is continuously communicated between the sensor portion 240 and the air induction device 300 of the cooking device 100, and the hazardous air is discharged under optimum conditions.

When the concentration of fine dust and gas density measured by the sensor portion 240 reach the clean level after completion of cooking, the air induction device 300 of the cooking device 100 automatically stops operation, and an alarm message for guiding the user to power off the ventilation device 200 is transmitted to the user, such that the user may power off the ventilation device 200 by recognizing the alarm message.

As described above, the user receives information about the quality of air generated from the cooking space, such that the user can recognize the quality of air generated from the cooking space and can more actively use the ventilation system 1 through the received air-quality information.

Although certain embodiments of the present disclosure provide that the sensor portion 240 is mounted to the ventilation device 200, the scope or spirit of the present disclosure is not limited thereto, and it should be noted that the same objects and effects as those of the present disclosure can also be achieved even when the sensor portion 240 is mounted to the cooking device 100. That is, when the sensor portion 240 is mounted to the ventilation device 200, the ventilation device 200 may directly receive information about the concentration of fine dust (ultra-fine dust) and gas density measured by the sensor portion 240, such that the ventilation device 200 may automatically adjust the intensity of suction airflow of the ventilation device 200, and the cooking device 100 wirelessly receives information about the fine dust (ultra-fine dust) and gas density measured by the sensor portion 240 through the communication portion 190. As a result, the intensity of discharge airflow is automatically adjusted.

In contrast, when the sensor portion 240 is mounted to the cooking device 100, the cooking device 100 may directly receive information about the concentration of fine dust (ultra-fine dust) and gas density measured by the sensor portion 240, such that the intensity of discharge airflow of the cooking device 100 is automatically adjusted. The ventilation device 200 may wirelessly receive information about the fine dust (ultra-fine dust) and gas density measured by the sensor portion 240 through the communication portion 290, such that the intensity of suction airflow of the ventilation device 200 is automatically adjusted on the basis of the received information.

Even when the sensor portion 240 is mounted not only to the cooking device 100 but also to the ventilation device 200, the same objects and effects as those of the present disclosure can also be achieved.

FIG. 6 illustrates aspects of the control logic for an induction fan according to certain embodiments of this disclosure.

Referring to the non-limiting example of FIG. 6, the ratio of a first-step suction airflow ($a_1$) of the hood fan 230 to a first-step discharge airflow ($b_1$) of the induction fan 330 may be identical to a predetermined ratio of a second-step suction airflow ($a_2$) of the hood fan 230 to a second-step discharge airflow ($b_2$) of the induction fan 330, as represented by ($a_1/b_1 = a_2/b_2 = f$).

According to certain embodiments, the ratio of a third-step suction airflow ($a_3$) of the hood fan 230 to a third-step discharge airflow ($b_3$) of the induction fan 330 may be identical to a predetermined ratio of the N-th step suction airflow ($a_n$) of the hood fan 230 to the N-th step discharge airflow ($b_n$) of the induction fan 330, as represented by ($a_3/b_3 = a_n/b_n = f$).

In this non-limiting example, when the value (a/b) is too small (when the discharge airflow of the induction fan 330 is much less than the suction airflow of the hood fan), the air induction device 300 may cause adverse effects in which the hazardous air is spread out.

In contrast, when value (a/b) is too high (when the discharge airflow of the induction fan 330 is much higher than the suction airflow of the hood fan), the static pressure effect of the air induction device 300 is not good, such that less hazardous air may be directed to the rear surface located far away from the user.

According to some embodiments, the ratio of the suction airflow of the hood fan 230 to the discharge airflow of the induction fan 330 is preferably kept at a predetermined ratio (f) in a manner that the hazardous air generated during cooking is directed to the rear surface located far away from the user so that the hazardous air can be safely and efficiently discharged outside.

FIG. 7 illustrates aspects of the control logic for adjusting suction and discharge airflows according to certain embodiments of the present disclosure.

Referring to the non-limiting example of FIG. 7, a measurement value corresponding to the highest level from among a fine dust measurement value (x), an ultra-fine dust measurement value (y), and a gas density measurement value (z), the intensity of suction airflow of the hood fan 230 and the intensity of discharge airflow of the induction fan 330 may be adjusted.

According to certain embodiments, when the fine dust measurement value (x) corresponds to the second step, the ultra-fine dust measurement value (y) corresponds to the first step, and the gas density measurement value (z) corresponds to the first step, the hood fan 230 and the induction fan 330 may operate in the second step corresponding to a high-order step from among the respective steps, thereby adjusting the intensity of suction airflow and the intensity of discharge airflow.

Situations where hazardous air generated during cooking can be exhausted using the ventilation system 1 will hereinafter be described with reference to FIGS. 8 and 9.

Figure 8:
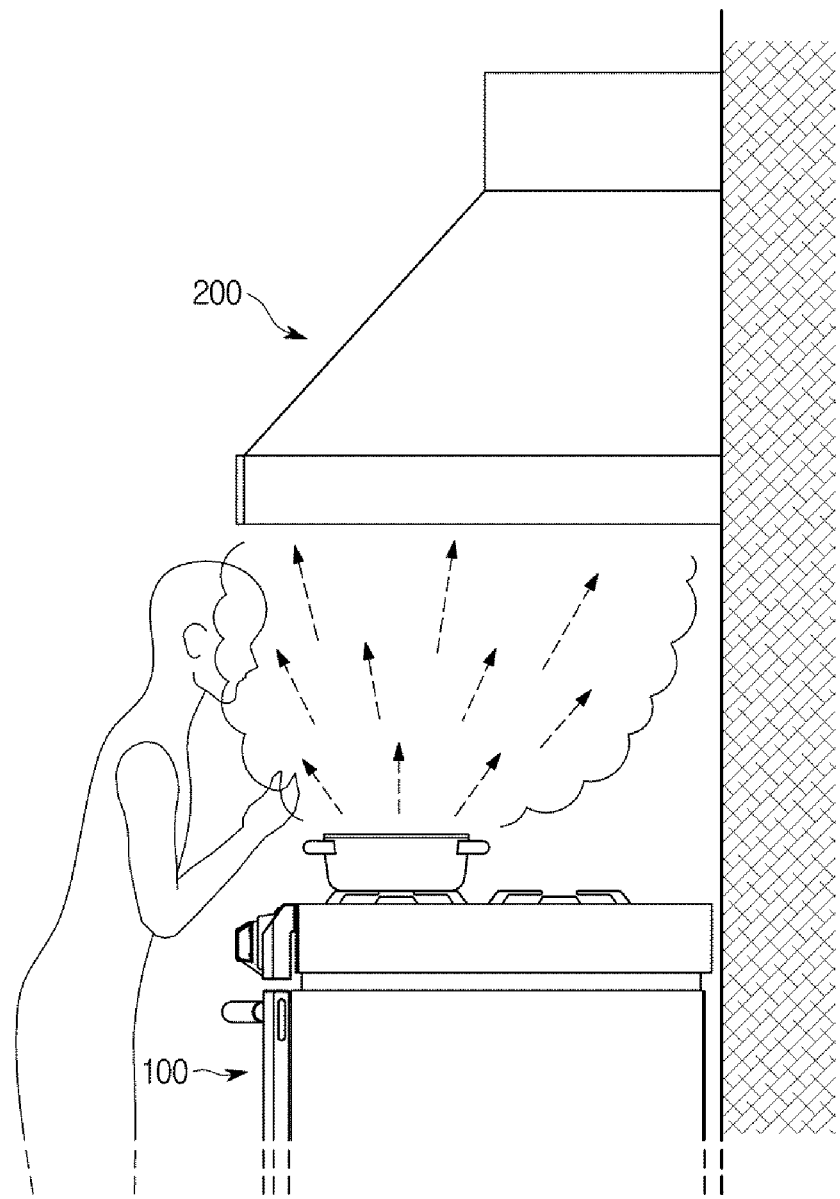
FIG. 8 provides an illustration of a situation in which hazardous air is discharged.

FIG. 8 illustrates a situation in which hazardous air is discharged outside using a ventilation device. FIG. 9 illustrates a situation in which hazardous air is discharged outside using a ventilation system according to certain embodiments of the present disclosure.

As can be seen from a general cooking situation of FIG. 8, hazardous air (smoke and fumes) generated during cooking may spread upward, may move close to the user's respiratory organs, and may move upward.

Figure 9:
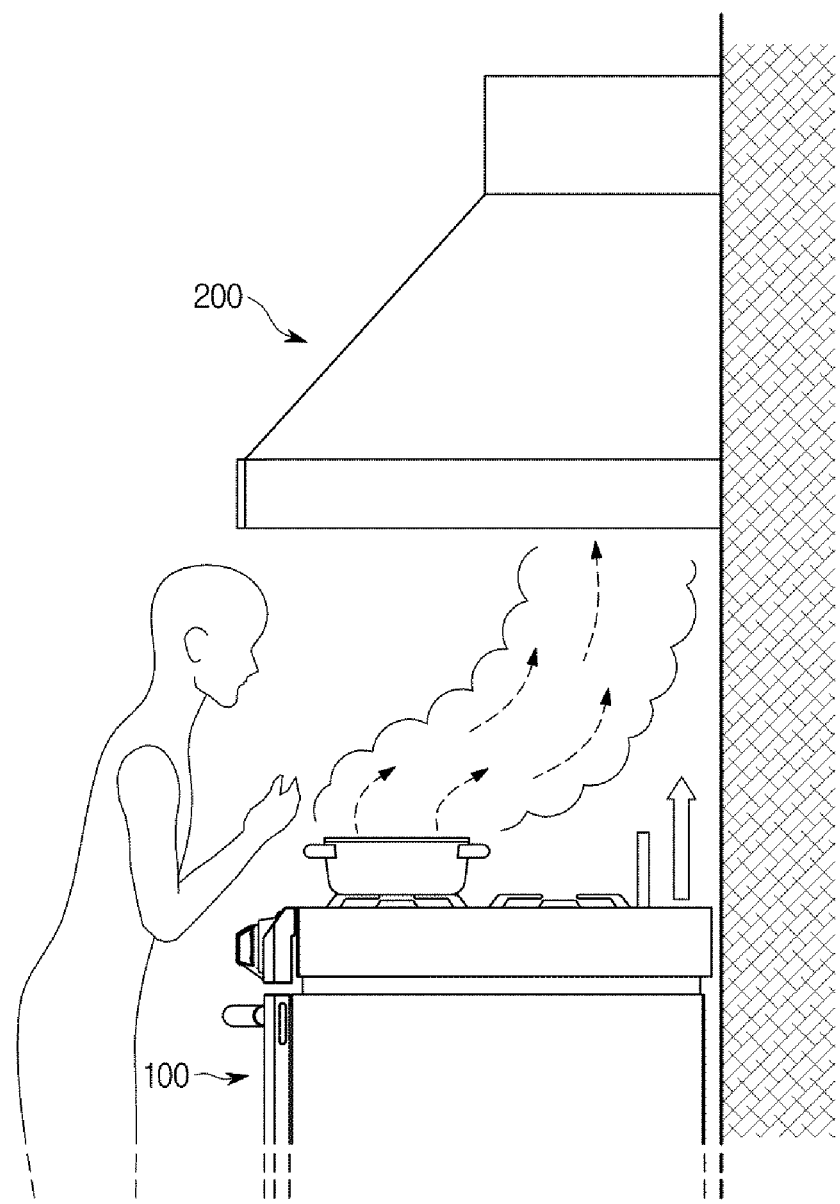
FIG. 9 illustrates a situation in which hazardous air is discharged outside using a ventilation system using systems and methods according to embodiments of the present disclosure.

Referring to the non-limiting example of FIG. 9, which depicts a cooking situation using the ventilation system 1, static pressure of the air induction device 300 located at a rear side or both sides of the cooking device 100 is reduced, hazardous air (smoke) generated during cooking is curved in a backward direction and then moves upward, such that the hazardous air (smoke) is prevented from being inhaled by a user.

According to certain embodiments, ventilation system 1 may allow the hazardous air generated during cooking to move upward while being curved in a backward direction of the cooking device 100 without being directly spread upward, such that the ventilation system 1 may prevent hazardous air generated by cooking from being inhaled by the user.

Figure 10A:
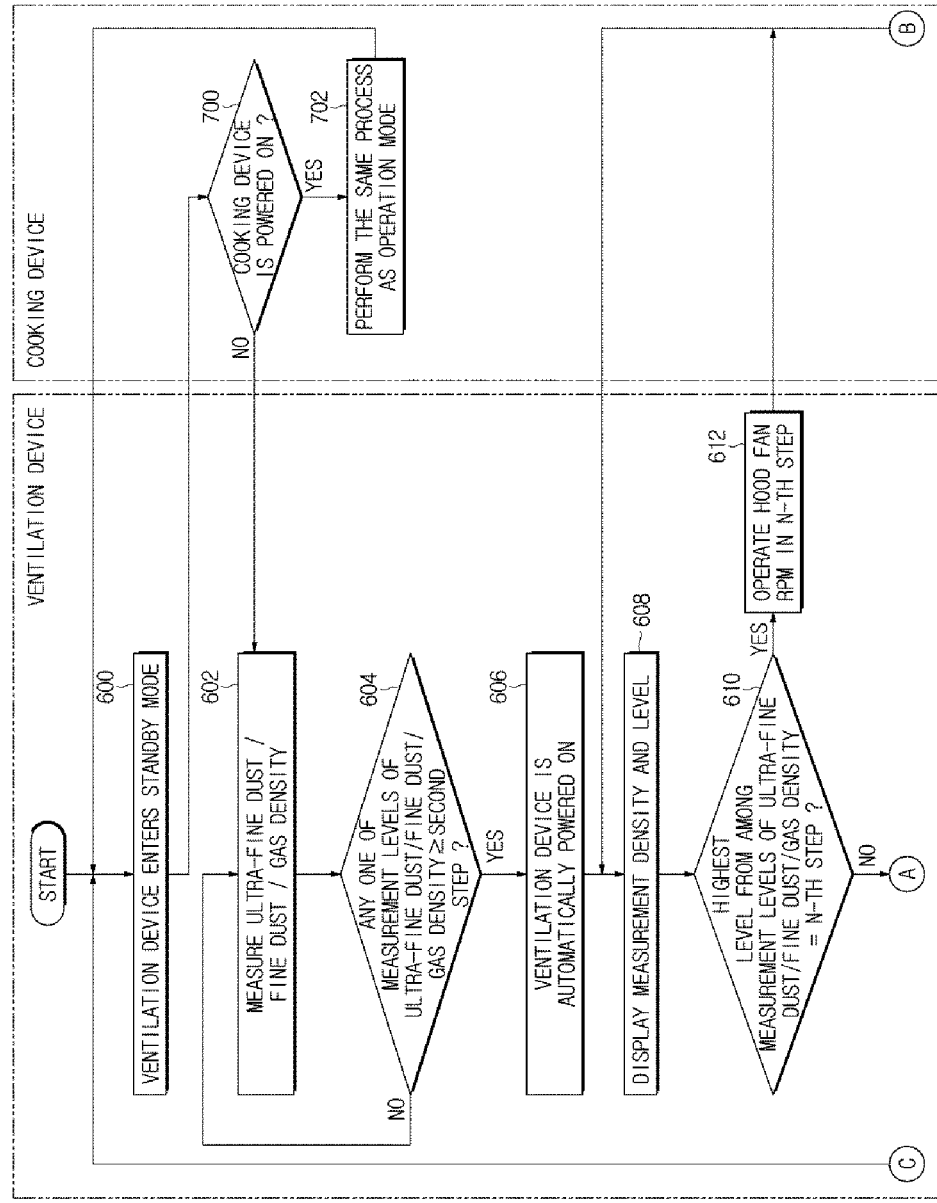
FIGS. 10A and 10B illustrate in flowchart format, an algorithm for controlling a safety mode of a ventilation system according to embodiments of the present disclosure.
Figure 10B:
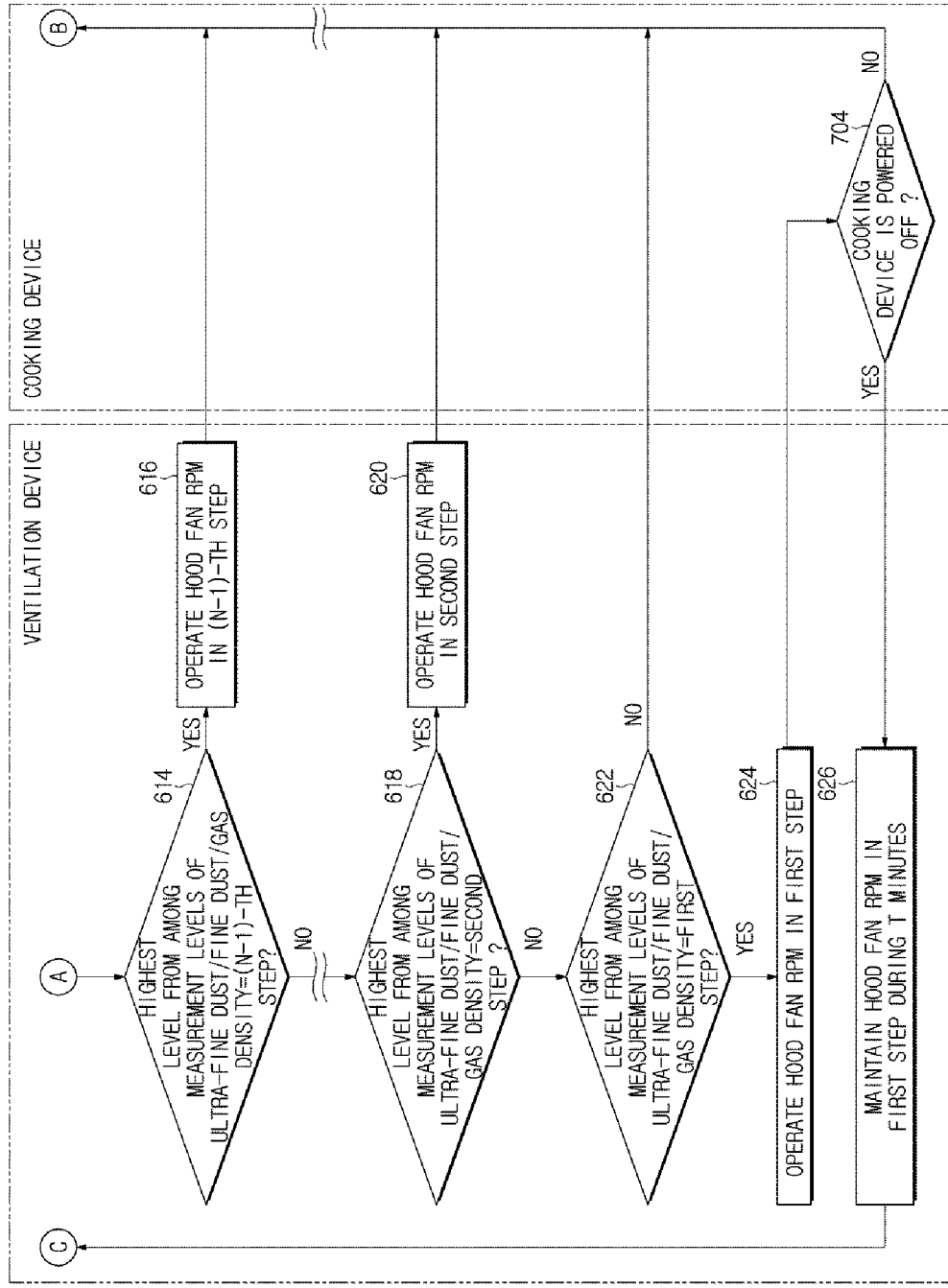

FIGS. 10A and 10B illustrate, in flowchart format, an algorithm for controlling a safety mode of the ventilation system according to certain embodiments of the present disclosure.

Referring to the non-limiting examples shown in FIGS. 10A and 10B, when the cooking device 100 is powered off, the ventilation device 200 may enter a standby mode as operation (600).

According to some embodiments, in the standby mode of the ventilation device 200, the ventilation system may determine whether or not the cooking device 100 is powered on (700).

In this non-limiting example, when the cooking device 100 is powered on (700), the cooker controller 170 operates the cooking device 100 using the same process as in FIGS. 5A and 5B (702), feeds back to operation 600, and performs subsequent operations starting from operation 600.

Even when the cooking device 100 is powered off (700), the ventilation device 200 may measure the concentration of fine dust (ultra-fine dust) and gas density contained in the air using the sensor portion 240 (602).

According to certain embodiments of the present disclosure, the ventilation controller 270 may determine the level of fine dust (ultra-fine dust) and the level of gas density measured by the sensor portion 240, and may determine whether any one of the measurement levels of fine dust (ultra-fine dust) and gas density is equal to or higher than the second level (second step) (604).

In this non-limiting example, when any one of the measurement levels of fine dust (ultra-fine dust) and gas density is less than the second level (second step) (604), the ventilation controller 270 feeds back to operation 602 in a manner that the sensor portion 240 continuously measures the degree of air pollution, for example, the concentration of fine dust (ultra-fine dust) and gas density contained in the air (operation 602).

In this non-limiting example, when any one of the measurement levels of fine dust (ultra-fine dust) and gas density is equal to or higher than the second level (second step) (604), the ventilation device 200 is automatically powered on (606).

In this non-limiting example, when the ventilation device 200 is powered on, the ventilation controller 270 may determine the level of fine dust (ultra-fine dust) and the level of gas density measured by the sensor portion 240, and may display the determined levels on the display 250 (608).

Subsequently, the ventilation controller 270 may determine whether the highest level from among the measurement levels of fine dust (ultra-fine dust) and gas density is set to the N-th step (610).

In this non-limiting example, when the highest level from among the measurement levels of fine dust (ultra-fine dust) and gas density is set to the N-th step (610), the ventilation controller 270 may operate the RPM of the hood fan 230 in the N-th step (612).

According to certain embodiments, when each of the measurement level of fine dust (ultra-fine dust) and the measurement level of gas density is set to the N-th step, the level (suction airflow) of the ventilation level 200 is adjusted to the N-th step so that hazardous air can be automatically discharged outside.

In this non-limiting example, when the highest level is not identical to the N-th step (610), the ventilation controller 270 may determine whether the highest level from among the measurement levels of fine dust (ultra-fine dust) and gas density is set to the (N−1)-th step (614).

In this non-limiting example, when the highest level is set to the (N−1)-th step (614), the ventilation device 200 may operate the RPM of the hood fan 230 in the (N−1)-th step (616).

According to certain embodiments, when each of the measurement levels of fine dust (ultra-fine dust) and gas density is set to the (N−1)-th step, the level (suction airflow) of the ventilation device 200 is adjusted to the (N−1)-th step, such that hazardous air can be automatically discharged outside.

In this non-limiting example, when the highest level is not identical to the (N−1)-th step (614), the ventilation controller 270 may determine whether the highest level from among the measurement levels of fine dust (ultra-fine dust) and gas density is set to the second step (618).

In this non-limiting example, when the highest level is set to the second step (618), the ventilation device 200 may operate the RPM of the hood fan 230 in the second step (620).

Therefore, when each of the measurement levels of fine dust (ultra-fine dust) and gas density is set to the second step, the level (suction airflow) of the ventilation device 200 is adjusted to the second step such that hazardous air can be automatically discharged outside.

When the highest level is not identical to the second step (618), the ventilation controller 270 may determine whether the highest level from among the measurement levels of fine dust (ultra-fine dust) and gas density is set to the first step (622).

When the highest level is set to the first step (622), the ventilation device 200 may operate the RPM of the hood fan 230 in the first step (624).

In this non-limiting example, when each of the measurement levels of fine dust (ultra-fine dust) and gas density is set to the first step, the level (suction airflow) of the ventilation device 200 is adjusted to the first step such that hazardous air can be automatically discharged outside.

According to certain embodiments, even when the cooking device 100 is turned off, the ventilation device 200 may measure the level of fine dust (ultra-fine dust) and the level of gas density contained in the air using the sensor portion 240, and the suction airflow intensity of the ventilation device 20 is automatically adjusted according to the measurement levels (the degree of air pollution) measured by the sensor portion 240, so that hazardous air can be discharged outside.

According to certain embodiments, the on/off operation of the ventilation device 200, the suction airflow intensity, etc. are automatically controlled without user intervention, such that the hazardous air generated from the cooking space can be efficiently discharged outside.

In this non-limiting example, the level (discharge airflow) of the air induction device 300 may be re-adjusted optimally according to the airflow level measured by the sensor portion 240.

Although the level (suction airflow) of the ventilation device 200 can be automatically adjusted according to the levels of fine dust (ultra-fine dust) and gas density measured by the sensor portion 240, it should be noted that the level (suction airflow) of the ventilation device 200 may also be directly manipulated by the user as necessary.

According to certain embodiments, it is determined whether the cooking device 100 is powered off (704). When the cooking device 100 is not powered off (704), the operation may feed back to step 608, the ventilation device 200 may adjust the suction airflow intensity according to the degree of air pollution measured by the sensor portion 240, and at the same time may perform the subsequent operations.

According to certain embodiments, when the cooking device 100 is powered off (704), the ventilation controller 270 may maintain the RPM of the hood fan 230 in the first step during a predetermined time (T minutes, for example, about 5 to 10 minutes) (626). After lapse of T minutes, the ventilation controller 270 feeds back to operation 600 and then enters the standby mode, at operation (600).

Various examples of the display for use in the ventilation system 1 according to one embodiment of the present disclosure will hereinafter be described with reference to FIGS. 11 to 13.

Figure 11:
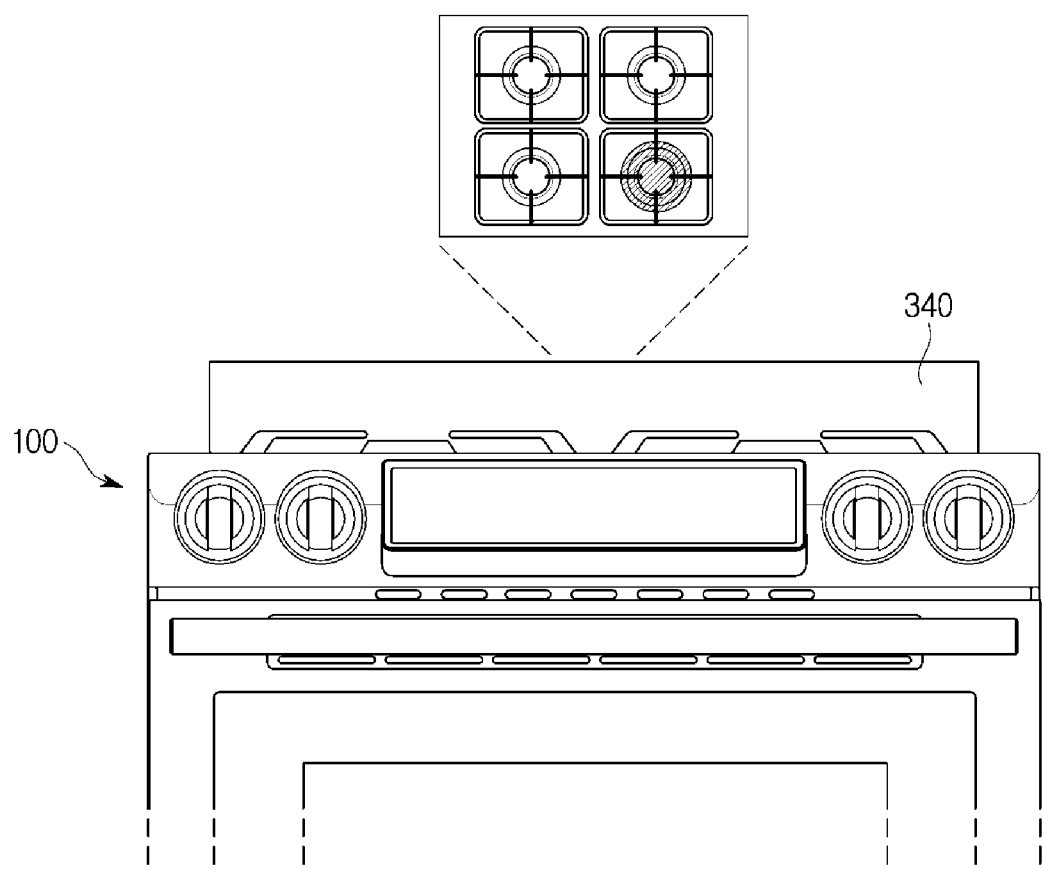
FIG. 11 illustrates a projection display of a ventilation system according to some embodiments of the present disclosure.

FIG. 11 illustrates a projection display of the ventilation system according to certain embodiments of the present disclosure.

Referring to the non-limiting example of FIG. 11, the blade 340 of the air induction device 300 provided to the rear surface of the cooking device 100 is opened so that the air outlet 320 is exposed and a projector located at a lower end of the blade 340 is also exposed. As a result, a display image is projected on the wall located close to the rear of the cooking device 100.

The display projected on the wall may display internal states of the oven 120, the operational state of each burner of the cooktop 130, and various kinds of information (e.g., the level of fine dust (ultra-fine dust), the level of gas density, etc.), such that the user located far away from the cooking device can view the operation states of the oven 120 and the cooktop 130

Figure 12:
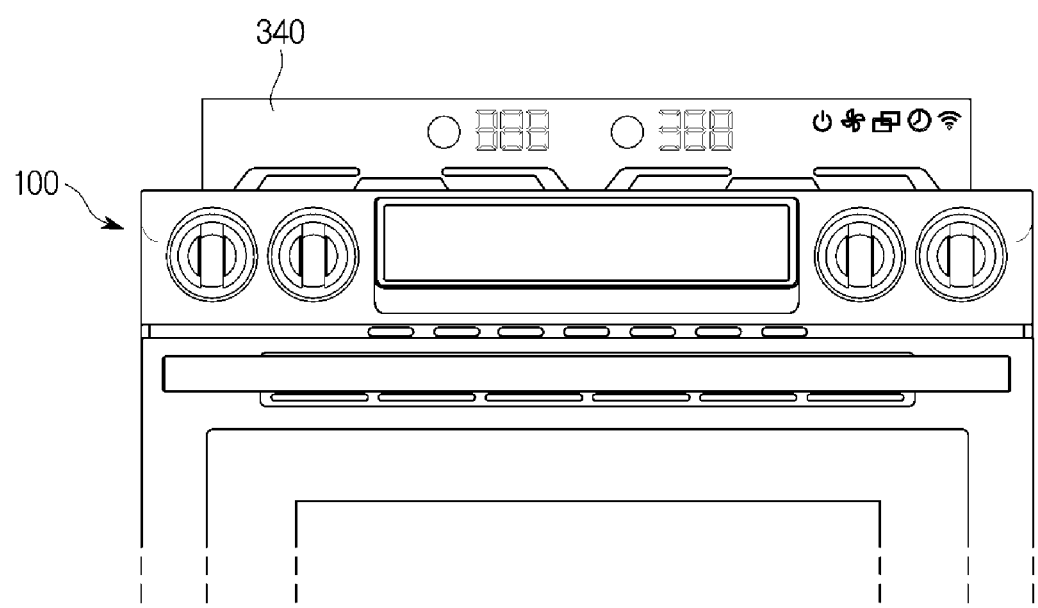
FIG. 12 illustrates a bar display of a ventilation system according to certain embodiments of the present disclosure.

FIG. 12 illustrates a bar display of the ventilation system according to certain embodiments of the present disclosure.

Referring to the non-limiting example of FIG. 12, the blade 340 of the air induction device 300 provided at the rear surface of the cooking device 100 is opened so that the air outlet 320 is exposed. The surface of the blade 340 is used as a display bar so that various kinds of information (e.g., the level of fine dust (ultra-fine dust) and the level of gas density) may be visually displayed on the blade 340.

Figure 13:
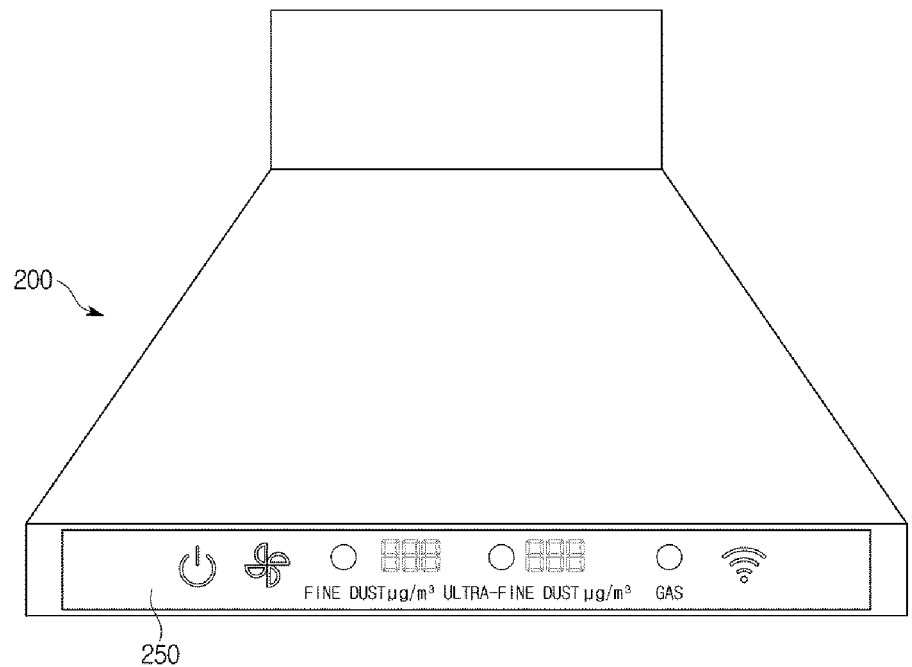
FIG. 13 illustrates a front display mounted to a front part of a ventilation system according to certain embodiments of the present disclosure.
Figure 13:
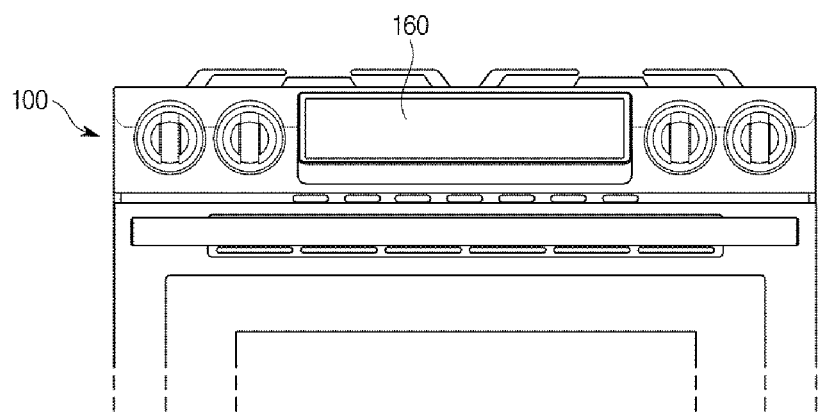

FIG. 13 illustrates a front display mounted to a front part of the ventilation system according to certain embodiments of the present disclosure.

Referring to the non-limiting example of FIG. 13, various kinds of information (e.g., the level of fine dust (ultra-fine dust) and the level of gas density) may be visually displayed on the front display 250 of the ventilation device 200.

As is apparent from the above description, certain embodiments of the ventilation system and the method for controlling the same can allow hazardous air generated by cooking to flow in a backward direction of a cooking device so as to quickly transfer the hazardous air to a hood, such that the hazardous air is prevented from being inhaled by a user. As a result, the hazardous air concentrated into a predetermined region without being dissipated is discharged outside, resulting in operation efficiency of the hood. In addition, information about a quality of air generated in a current state of a cooking space is transferred to a user so that the user can more actively use the ventilation system, resulting in protection of the user's health.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A ventilation system comprising:
    a cooking device;
    a ventilation device installed at an upper part of the cooking device, and configured to discharge hazardous air generated during cooking; and
    a sensor portion configured to measure levels of fine dust and gas density contained in the hazardous air,
    wherein the cooking device further includes an air induction device configured to direct the hazardous air to a rear side of the cooking device according to the measurement levels of fine dust and gas density measured by the sensor portion so that the hazardous air is transmitted to the ventilation device,
    wherein the air induction device comprises an air outlet configured to discharge air and a blade configured to open or close the air outlet, and
    wherein a direction of movement of the air discharged through the air outlet is controlled according to an angle of the blade.

2. The ventilation system according to claim 1, wherein the air induction device is mounted to a rear surface of the cooking device, is configured to generate movement of air toward the ventilation device, and is configured to direct the hazardous air to the rear side of the cooking device.

3. The ventilation system according to claim 2, wherein the air induction device further includes:
    an induction fan installed in the air outlet, and configured to generate movement of air toward the ventilation device.

4. The ventilation system according to claim 3, further comprising:
    a hood fan configured to perform air ventilation so as to discharge the hazardous air,
    wherein a suction airflow, the suction airflow comprising an airflow suctioned into the ventilation device by the hood fan and an airflow suctioned into the ventilation device by the induction fan, is summed, such that intensity of the suction airflow is adjusted according to the summed airflows.

5. The ventilation system according to claim 4, further comprising:
    a controller configured to control a discharge airflow discharged through the air outlet and the suction airflow suctioned into the ventilation device,
    wherein the controller is configured to adjust intensity of the discharge airflow and intensity of the suction airflow according to the measurement levels of fine dust and gas density measured by the sensor portion.

6. The ventilation system according to claim 5, wherein the controller is configured to set a ratio of the discharge airflow and the suction airflow to a predetermined ratio, and adjust a revolutions per minute (RPM) of the induction fan and an RPM of the hood fan.

7. The ventilation system according to claim 5, wherein:
    the sensor portion is configured to measure the fine dust and gas density contained in the hazardous air even when cooking is not carried out; and
    the controller is configured to adjust the intensity of the suction airflow according to the measurement levels of fine dust and gas density measured by the sensor portion.

8. The ventilation system according to claim 5, wherein:
    the sensor portion is mounted to the ventilation device; and
    the ventilation device further includes a communication portion communicating with the cooking device.

9. The ventilation system according to claim 5, further comprising:
    a display configured to display the fine dust and gas density measured by the sensor portion using numerals, colors, and letters,
    wherein the controller, when the fine dust and gas density measured by the sensor portion exceed a safety reference, informs a user of an excess of the fine dust and gas density using the display.

10. The ventilation system according to claim 1, wherein the air induction device is mounted to both sides of the cooking device, and is configured to generate movement of air toward the ventilation device, such that the hazardous air is directed to both sides of the cooking device.

11. A method for controlling a ventilation system which includes a cooking device, a ventilation device installed at an upper part of the cooking device to discharge hazardous air generated during cooking, and an air induction device mounted to a rear surface of the cooking device to direct the hazardous air to a rear side of the cooking device, the air induction device comprising an air outlet to discharge air, the method comprising:
    determining whether the cooking device is powered on;
    when the cooking device is powered on, automatically powering on the ventilation device, and operating a hood fan mounted to the ventilation device;
    when the hood fan is operated, operating an induction fan mounted to the air induction device, and generating movement of air toward the ventilation device;
    measuring, by a sensor portion, levels of fine dust and gas density contained in air generated during cooking;
    adjusting an airflow suctioned into the hood fan and an airflow discharged through the induction fan according to levels of fine dust and gas density measured by the sensor portion; and
    adjusting a direction of movement of the air discharged through the air outlet according to an angle of a blade configured to open or close the air outlet.

12. The method according to claim 11, wherein:
    the induction fan installed in the air outlet generates movement of air toward the ventilation device, and directs the hazardous air to the rear side of the cooking device.

13. The method according to claim 12, wherein the adjusting the airflow suctioned into the hood fan and the airflow discharged through the induction fan includes:
    adjusting the airflow suctioned into the ventilation device according to a revolutions per minute (RPM) control of the hood fan and the airflow discharged through the air outlet according to RPM control of the induction fan.

14. The method according to claim 11, further comprising:
  when the cooking device is powered off, switching the ventilation device to a standby mode, and measuring fine dust and gas density contained in air using the sensor portion; and
  adjusting the airflow suctioned into the hood fan according to the levels of fine dust and gas density measured by the sensor portion.

15. The method according to claim 11, further comprising:
  displaying the measured fine dust and gas density on a display using numerals, colors, and letters; and
  when the measured fine dust and gas density exceed a safety reference, informing a user of an excess of the fine dust and gas density using the display.

\* \* \* \* \*